US005442334A

United States Patent [19]

Gallo et al.

[11] Patent Number: 5,442,334

[45] Date of Patent: Aug. 15, 1995

[54] SECURITY SYSTEM HAVING DEACTIVATABLE SECURITY TAG

[75] Inventors: Frank F. Gallo, Bristol; Yan P. Bielek, Cumberland; Riccardo Tebano, Bristol; Mark P. Sardinha, Barrington, all of R.I.

[73] Assignee: Stoplift Corporation, Bristol, R.I.

[21] Appl. No.: 915,310

[22] Filed: Jul. 20, 1992

[51] Int. Cl.[6] .................... G08B 13/14; B32B 31/00

[52] U.S. Cl. .................... 340/572; 156/272.2

[58] Field of Search .................... 340/572, 551; 156/272.2, 274.2; 427/457, 504

[56] References Cited

U.S. PATENT DOCUMENTS

| | | | |
|---|---|---|---|
| 3,810,147 | 5/1974 | Lichtblau | 340/572 |
| 3,967,161 | 6/1976 | Lichtblau | 340/572 |
| 4,251,808 | 2/1981 | Lichtblau | 340/572 |
| 4,273,603 | 6/1981 | Peronnet et al. | 156/236 |
| 4,325,087 | 4/1982 | Moris | 360/13 |
| 4,392,236 | 7/1983 | Sandstrom | 378/45 |
| 4,555,414 | 11/1985 | Hoover et al. | 427/504 |
| 4,567,473 | 1/1986 | Lichtblau | 340/572 |
| 4,692,747 | 9/1987 | Wolf | 340/572 |
| 4,728,938 | 3/1988 | Kaltner | 340/572 |
| 4,835,524 | 5/1989 | Lamond et al. | 340/572 |
| 4,920,335 | 4/1990 | Andrews | 340/572 |

*Primary Examiner*—John K. Peng
*Assistant Examiner*—Thomas J. Mullen, Jr.
*Attorney, Agent, or Firm*—Salter & Michaelson

[57] ABSTRACT

A security system including a security tag for attachment to an article sold in a retail establishment, the security tag being formed with a coil having a tuned resonant frequency. The coil is formed of a composition of materials that includes a flake-like conductive metal that is intermixed with a resin, solvent and additives to define a paste-like composition that is adhered to a substrate in a coil configuration. A neutralizer device is formed as part of the security system and is operated to produce a high intensity magnetic field that emits eddy currents for melting the coil and thereby disabling the security tag when the tag is placed in close proximity thereto.

11 Claims, 2 Drawing Sheets

SECURITY SYSTEM HAVING DEACTIVATABLE SECURITY TAG

BACKGROUND OF THE INVENTION

The present invention relates to a security system having a deactivatable security tag that is applied to an article normally located for sale in a retail establishment. More particularly, the subject invention relates to a security tag for use in a security system wherein the tag includes a coil having a resonant frequency and that is formed of a unique composition of materials that incorporates a conductive material therein. The invention further includes a neutralizing device that generates a high energy magnetic field for deactivating the coil of the security tag.

Electronic security systems that utilize a security tag having a resonant circuit of a predetermined tuned frequency are in common use and are generally employed for the purpose of preventing theft of goods in a retail establishment. Examples of security tags known heretofore that incorporate a resonant tag circuit therein are illustrated in the following United States patents and represent the relevant prior art known to the applicants: LICHTBLAU, U.S. Pat. Nos. 3,810,147; LICHTBLAU, 3,967,161; LICHTBLAU, 4,567,473; LAMOND et al, 4,835,524 and ANDREWS, 4,920,335.

The security tags as described in the prior known systems are tuned to a specific frequency such that a resonant condition resulting from an RF field is sensed when the articles containing the tag pass through a controlled area. In some of the prior known devices, the security tag is deactivated by a paste-over applied thereto in the form of a metalized sticker that prevents the resonant circuit from causing an alarm when passed through an exit scanning area. In a more recent form of security tag, the coil that defines the circuit of the tag is provided with a fused element that when subjected to a swept frequency of higher energy than that employed for detection, the fusible link of the resonant circuit is destroyed to deactivate the tuned circuit so that detection is no longer possible. In this circumstance, a deactivating device which is located at a checkout area in a retail establishment is operable to produce the high energy field for deactivating the tuned circuit of the security tag. Thereafter, when a customer with a deactivated tag applied to an article as purchased passes through an exit area, the resonant circuit of the security tag which has been deactivated will not resonate a signal for causing an alarm to be sounded when swept by a predetermined frequency.

The heretofore known security tags have normally included a spiral conductor that functions as an inductor of the resonant circuit of the tag and is usually comprised of a conductive material such as aluminum or the like. Aluminum may be etched in a dielectric substrate in the spiral strip, a conductive plate which defines a capacitor usually being located in series with the inductive spiral strip. Although the conductive aluminum etch material has been found to be satisfactory for the purposes intended, the spiral aluminum strip is limited in the manner of use thereof and must be applied to merchandise as sold in a retail establishment by the adhering thereof directly onto the article. This procedure in not only labor intensive, but is subject to improper removal. Further, since the coil that defines the prior known security tag is formed by a special process and with special kinds of equipment, these security tags must be applied to the articles in the retail establishment separately from other kinds of identifying labels normally attached to said articles, and as a result are usually discernable by casual observance.

As will be described hereinafter, the present invention not only includes a security tag that has a resonant frequency coil incorporated therein, but includes a tag formed of composition materials that are easily printable on various kinds of substrates, such as film, paper or cloth that are easily attachable to a retail store article. Further, as will be described, a unique neutralizing system is employed in the subject invention to deactivate the security tag as the article to which it is attached passes through a controlled checkout area.

SUMMARY OF THE INVENTION

The present invention relates to a security system having a deactivatable security tag that is applied to an article normally located for sale in a retail establishment. The security tag as embodied in the subject invention includes a dielectric substrate, a coil having electrical conductive characteristics being imprinted on a surface of the substrate, the coil defining an electrical circuit having a predetermined single tuned resonant detection frequency and being normally responsive to a swept radio frequency signal transmitted at said predetermined tuned detection resonant frequency, wherein the circuit as defined by the coil resonates to produce a signal that is detectable by an alarm circuit that is formed as part of the security system. The coil that defines the electrical circuit is formed of a material that includes electrically conductive particles and a binder for retaining the conductive particles in an oriented relation, thereby providing for electrical conductivity throughout the coil. A unique feature of the tag of the present invention is that the coil is responsive to application of a predetermined magnitude of induction heat that is emitted from a source of an electromagnetic field located in close proximity thereto, thereby resulting in disorientation or melting of the conductive material in the coil, whereby the resistance thereof is increased to inhibit electrical conductivity therethrough.

Another feature of the system as embodied in the present invention is to provide a deactivating or neutralizing device that transforms rectified line voltage, the rectified voltage being introduced into a high voltage transformer, wherein the high voltage as obtained from the transformer causes a high intensity, electromagnetic field to be emitted that produces induction heat of sufficient intensity to increase the resistance of the coil when the coil is placed in close proximity thereto.

Still another feature of the subject invention provides for the printing of the coil on a variety of substrates, including paper or cloth, and in order to enable a printing of the conductive coil to be obtained with a required frequency, the coil is formed of particles of conductive material that are selected from a group consisting of silver flake, silver-coated mica, nickle-coated mica, silver-coated titanium dioxide, nickel-coated fiber, nickel-coated wollastonite, titanium black powder, carbon black and silver-coated phenolic resin. A resin having suitable characteristics as a binder retains the conductive flakes in proper oriented relation so that conductivity therethrough is obtained at a predetermined resistance that enables the coil to resonate at the required tuned frequency. Additives of selected characteristics are also added to the composition as formed in the coil of the subject invention, the additives insuring that the coil will be retained in proper relation on the substrate to which it is applied.

As described hereinbelow, the method by which the security tag of the subject invention is formed also constitutes a unique part of applicants' invention.

Accordingly, it is an object of the present invention to provide a security system having a deactivatable security tag and a method by which the security tag is formed that enables the security tag to be applied to an article normally for sale in a retail establishment in a simple and inexpensive form, wherein the tag includes a coil having electrical conductive characteristics and that defines an electrical circuit having a single tuned resonant frequency and is applied by an imprinting technique to a label as affixed to the article.

Another object of the invention is to provide a security tag for use in a security system that is defined by a coil that is formed of a composition having electrical conductive flakes or particles embodied therein, the coil being imprintable on a substrate surface.

Still another object of the invention is to teach a method of forming a security tag that is utilized in a security system and that includes a coil that is formed from a material that includes particles of a conductive material and a binder for retaining the conductive material particles in an oriented relation that provides for electrical conductivity throughout the coil.

Still another object is to provide a neutralizing or deactivating device for use in a security system that emits a high voltage, electromagnetic field that produces induction heating for increasing the resistance of a coil of a security tag placed in proximity thereto, wherein electrical conductivity through the coil is prevented.

Other objects, features and advantages of the invention shall become apparent as the description thereof proceeds when considered in connection with the accompanying illustrative drawings.

DESCRIPTION OF THE DRAWINGS

In the drawings which illustrates the best mode presently contemplated for carrying out the present invention.

DESCRIPTION OF THE INVENTION

Figure 1:
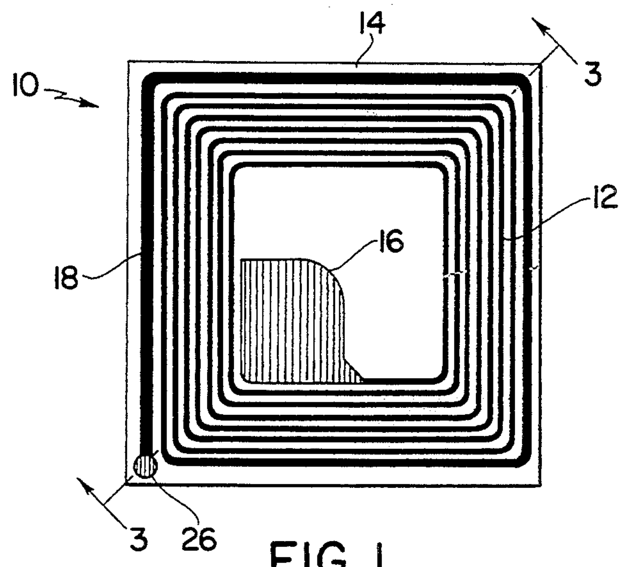
FIG. 1 is a plan view illustrating the tag of the subject invention and that includes a coil having a tuned resonant circuit, the coil being imprinted on a dielectric substrate.
Figure 2:
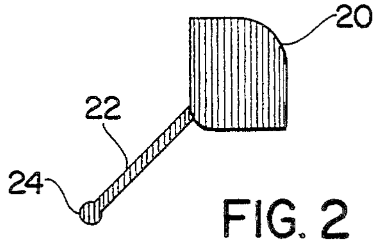
FIG. 2 illustrates the second plate of the capacitor that is used in conjunction with the coil as illustrated in FIG. 1 to define the security tag of the subject invention.
Figure 3:
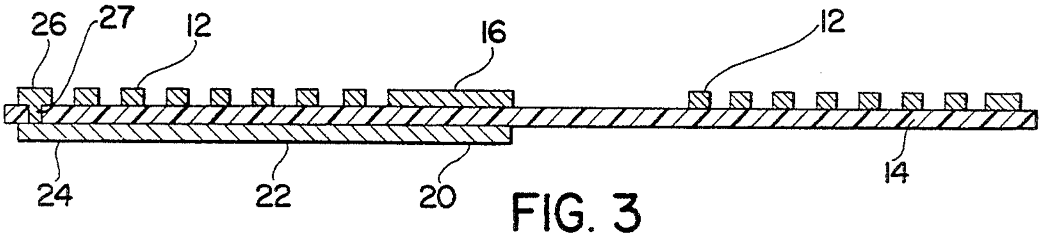
FIG. 3 is a sectional view taken along line 3—3 in FIG. 1.

Referring now to the drawings and particularly to FIGS. 1–3, the security tag embodied in the subject invention is illustrated and is generally indicated at 10. The security tag 10 includes a resonant tag circuit in coil form of known configuration; although as will be described, the material from which the coil is formed is distinctly different from the prior known coils as utilized in security systems known heretofore.

Figure 4:
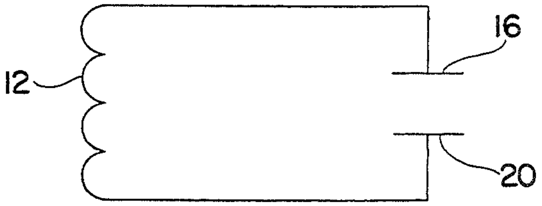
FIG. 4 is a schematic diagram of the resonant tag as embodied in the subject invention.

The circuit of the resonant security tag as embodied in the security tag 10 is defined by a plurality of coils indicated at 12 that are formed in a continuous square coil and are disposed on a dielectric substrate 14 as indicated in FIG. 3. The substrate 14 is preferably formed of a thin film of polyester (Mylar), but other dielectric films, such as polyethylene, polypropylene, polyamid (Nylon) mica paper and cloth can also be used effectively as a substrate for the coil 12. As will be further described, the coil 12 is deposited on a surface of the substrate 14 by using a printing technique, the coil being located in series with an upper plate 16 of a capacitor that is formed as a component of the resonant circuit. An outer coil element 18 of the coil 12 includes end portion 26 that terminates at a corner of the substrate 14. A lower capacitor plate 20 is disposed on the underside of the substrate 14 and is located in series with the coil 12 through an elongated conductor element 22 having an end portion 24 that is disposed directly beneath the end portion 26 of the outer coil element 18. A connector 27 extends into a through opening formed in the substrate 14 and provides for electrical interconnection of the outer coil element 18 and the capacitor conductor element 22. Thus, the plates 16 and 20 of the security tag capacitor are insulated from each other and are located in series with the conductor coil 12 as is common in security tags to which the subject invention relates. The security tag 10 is tuned to a predetermined resonant frequency and is responsive to the specific frequency such that a resonant condition resulting from an RF field is sensed when an article to which the security tag is secured passes through a controlled area, as will be described. The coil 12 thus defines an induction circuit that is located in series with the capacitor as defined by the plates 16 and 20 which form a resonant tuned circuit that is responsive to a resonant frequency as transmitted through a conventional transmitting unit. A simplified illustration of the resonant circuit of the tag 10 illustrated in FIG. 3 is shown in FIG. 4

Prior to the instant invention, the inductor or coil of the prior commercially known security tags and which defines the resonant circuit of the tag was applied to a dielectric substrate as an aluminum strip or etch or the like. The aluminum etch or strip was approximately 0.030 in. wide and about 0.002 in. high and was normally applied to a dielectric substrate in a conventional manufacturing process. The aluminum material of the prior known security tag coil constituted a sufficient conductor for the transmission of a signal of tuned frequency therethrough. However, the etched aluminum coil was limited in the use thereof and necessarily was applied to a nonconducting plastic film.

The subject invention differs significantly from the prior known security tags in that the coil 12 is formed of a composition material having a conducting component contained therein and that is applied to the substrate 14 by a printing technique. The coil 12 also includes characteristics, as will be described, that enables the circuit therethrough to be interrupted or resistance thereof to be significantly increased to prevent transmission of a tuned signal therethrough. Thus, when it is desired to deactivate the security tag 12 when an article to which the security tag is secured is presented at a checkout station in a retail establishment, a neutralizer device is utilized which, as will be described, deactivates or neutralizes the circuit in the tag, wherein an alarm is prevented from being sounded when the article with the security tag attached is scanned by a scanning device that is located at an exit area in the retail establishment.

It is contemplated to construct the coil 12 of the security tag 10 with a detection frequency in the range of approximately 5 mhz to 12 mhz since scanning equipment can easily produce a signal within the indicated range. In order to provide for the desired detection frequency, it is necessary that the resistance in the coil be sufficiently low enough to enable the coil to resonate at the predetermined frequency when an electromagnetic field is generated in close association therewith. In connection with the coil as utilized in the subject invention, a range of 1–10 ohms resistance is preferable, and a tag of the subject invention having a resistance in this range will provide for suitable conductivity of a signal therethrough for enabling the circuit to resonate at the tuned frequency.

As mentioned hereinabove, the coil 12 of the security tag 10 of the subject invention is formed of materials that are distinctly different from the coils of the prior art devices; and in the subject invention, the coil 12 is defined by a composition that includes particles of conductive material, such as silver flake, silver-coated mica, nickel-coated mica, silver-coated titanium dioxide, nickel-coated fiber, nickel-coated wollastonite, titanium black powder, carbon black and silver-coated phenolic resin and other suitable conductive materials. Since the coil as utilized in the subject invention incorporates particles of conductive material, it is necessary that the conductive material particles be adhered in a manner that provides for the orientation thereof for producing the required conductivity therethrough. In order to accomplish this purpose, the subject invention provides that a binder such as a resin be mixed with the conductive material. A suitable resin that is utilized for binding the conductive material in appropriate oriented relation may be an alkyd, epoxy, polyacryl, polyamid, polyurethane, polyvinyl acetate, hydrocarbon resin, nitrocellulose, polyvinyl chloride, and rosin or other suitable resins, and may further include a copolymer comprising two or more monomers selected from a group consisting of acryl, vinyl, styrene, urethane, vinyl acetate and oil.

The composition of the coil as embodied in the subject invention normally includes a solvent and water that are intermixed with a plurality of additives having predetermined selected characteristics, depending upon the substrate on which the coil is placed. It is contemplated that the substrate on which the coil 12 is printed be formed of a dielectric material having nonconducting characteristics; and in this connection, a wafer thin substrate such as Mylar is preferred, although other thicker materials of plastic can be utilized; and it is further contemplated that the coil be imprinted on paper or cloth materials. The kind of material from which the substrate is selected would depend upon the manner of use of the security tag and the environment in which it would be used. Therefore, a security tag attached to an article for sale in a retail establishment having a relatively firm surface would dictate the use of a Mylar substrate, whereas if it is desired to imprint the coil on a label that would be attachable to a grocery store article, such as a can, carton or the like, a paper label would be preferred. If the article with which the security tag is to be used is of a fabric material, then a fabric label would be preferred as the substrate on which the coil is printed. Although not disclosed herein, it is contemplated that the substrate 14 on which the coil 12 is imprinted be placed on an article by a dispensing device. Other manufacturing techniques are also contemplated that would be used when printing the coil 12 on a selected substrate of a suitable material that would be applied to an article of manufacture.

Figure 5:
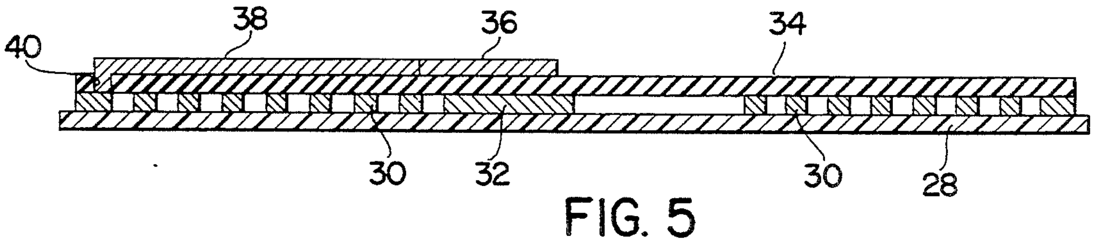
FIG. 5 is a sectional view of a modification of the security tag as embodied in the subject invention.

Referring now to FIG. 5, a modified form of coil construction is illustrated where rather than printing the second plate of the capacitor on the rear surface of a substrate, the second capacitor plate is printed on a second plastic film that is utilized as an insulator for the coil that is printed on the surface of a conventional film substrate. As shown in FIG. 4, a substrate defined by a plastic film of Mylar or the like is indicated at 28. A spiral coil 30 including a conductive material and defined by a composition of selected materials as set forth above is imprinted on the upper surface of the substrate 28. Also imprinted with the coil 30 interiorly thereof and formed of the same composition as the coil 30 is a capacitor plate 32. Insulating the coil 30 and the capacitor plate 32 is an insulation film 34 that is formed of a selected film material such as Mylar or the like. A second capacitor plate 36 having a leg 38 attached thereto and formed of a composition of selected materials that are identical to those contained in capacitor 32 and coil 30 is imprinted on the upper surface of the insulator film 22. The outermost end of the leg 38 of the capacitor plate 36 makes contact with the coil 32 by means of an opening 40 that extends through the film 22, whereby the capacitor plate 36 is located in series with the coil 30.

When the composition that is embodied in the present invention is supplied to a dielectric substrate certain additives are applied to the composition that are utilized for specific purposes. For example, a dispersing agent is added to the composition to aid in dispersing the composition on the substrate. Examples of dispersing agents are polyethylene-oxide alkyl-aryl ether, dioctyl sodium sulfosuccinate, and sodium alkylaryl polyether sulfonate. A defoamer may be used with water based materials and is ground or mixed with a solvent as incorporated into the composition. The defoamer is used to break or avoid bubbling in the mixing of the materials as selected for use in the composition. A silicone based defoamer intended for use in the composition is arylalkyd modified methyl-alkyl polysiloxane, and an example of a non-silicone based defoamer is 2,4,7,9-tetramethyl-5-decyn-4,7-diol. A leveling additive may be added after the composition is imprinted in place on a Mylar substrate and renders the surface more even and glossy. An example of a leveling additive as incorporated into the subject invention is polyether modified di-methyl-polysiloxanes.

In order to prevent the printing composition from marring the substrate, a mar resistant additive is mixed in the composition. Examples of mar resistant additives are polyester modified methyl-alkyl-polysiloxanes, micronized low density polyethylene, and micronized polytetrafluorethylene (PTFE). Slip additives are also added to the composition and are normally applied with the mar resistant additives. An example of a slip additive is polyether modified polysiloxane copolymer. A substrate wetting additive is also contemplated for use in wetting the substrate that is coated with the printing material, and an example of a substrate wetting additive is polyether modified methyl-ethyl-polysiloxanes. Finally, it may be desirable to add a thickener to the composition to make the composition more pasty for application to the substrate. Examples of such thickeners are hydroxyethylcellulos, alkali-soluable acrylic polymer, and alkali-swellable acrylic polymer.

In mixing the composition it is further desirable to mix a solvent with the resin and additives prior to applying the conductive flake material, and examples of solvents are ethylene-glycol-mono-butyl-ether, n-bytyl alcohol, 1-methyl-2-pyrrolidinone, and 2,4,7,9-tetramethyl-5-decyn-4,7-diol. Other solvents contemplated for use are ethylene-glycol-mono-butyl-ether and diethylene-glycol-mono-butyl-ether.

In the mixing of the printing material that comprises the composition of the subject invention, relative percentages of the materials as described above and that are used in the composition are as follows.

| Material | Percent by Weight |
|---|---|
| electro conductive flake or powder | 5–75 |
| resin or binder | 0–45 |
| solvent or cosolvent | 0–50 |
| water | 0–25 |
| defoamer | 0–10 |
| dispersing agent | 0–15 |
| leveling additive | 0–10 |
| mar resistant additive | 0–25 |
| slip additive | 0–15 |
| substrate wetting additive | 0–15 |
| thickener | 0–10 |

Examples of the composition of the material for forming a coil as embodied in the present invention are presented hereinafter to clarify the invention but are not intended to be limited relative thereto:

Example #1

| Material | Percent by Weight |
|---|---|
| nickel-coated mica | 45.0 |
| short oil alkyd (75% solution) | 20.0 |
| di-methyl-ethanol-amine | 2.0 |
| ethylene-glycol-mono-butyl-ether | 7.0 |
| n-bytyl alcohol | 3.0 |
| water | 21.5 |
| polyethylene-oxide-octyl-aryl-ether | 0.5 |
| micronized polytetrafluorethylene | 0.3 |
| polyether modified methyl-ethyl-polysiloxane | 0.5 |
| alkali-soluable acrylic polymer | 0.2 |
| | 100.0 |

In mixing the materials as set forth above, the resin and solvent were mixed together and the additives then added thereto. Finally, the nickel-coated mica material was added and the composition charged in a mill and ground to obtain a homogeneous paste which resulted in a 7.5 grind gauge on the Higman scale. The paste was then applied as a coil to a Mylar substrate by any suitable printing technique. In forming a coil of the composition as set forth in Example #1, a resonant frequency of 9.9 mhz was obtained, and the resistance of the coil as measured was 1200 ohms which was unacceptably high. Viscosity of the composition measured 2500 cps as obtained by a Brookfield spindle #3 running at 20 rpm.

Example #2

| Material | Percent by Weight |
|---|---|
| silver coated mica pigment | 55.0 |
| water reducible polyurethane (35% in water) | 25.0 |
| 1-methyl-2-pyrrolidinone | 5.0 |
| water | 12.8 |
| 2,4,7,9-tetramethyl-5-decyn-4,7-diol | 1.0 |
| dioctyl-sodium-sulfosuccinate | 0.5 |
| micronized low density polyethylene | 0.5 |
| hydroxyethylcellulose | 0.2 |
| | 100.0 |

A silver-coated mica material was utilized as the electrical conductant in the composition of Example #2. The binder or resin was a water-reducible polyurethane that was mixed with a solvent such as 1-methyl-2-pyrrolidinone, and 2,4,7,9,-tetramethyl-5-decyn-4,7-diol and water. The dispersing agent dioctyl-sodium-sulfosuccinate was added to the mixture together with the mar resistant additive micronized low density polyethylene and with the thickener agent hydroxyethylcellulose.

The ingredients without the silver coated mica material and the electrical conductive material were mixed together to form a paste, and the silver-coated mica material was then added to the paste material which was then printed as a coil on a suitable dielectric substrate such as Mylar.

The resistance of the composition as produced by the above example measured approximately 0.05 ohms/sq. cm. and the paste viscosity was 3000 cps using a Brookfield spindle operating at 20 rpm. The resistance of the coil as formed by the paste on the dielectric substrate measured 96 ohms, which was somewhat high for detection in a security tag. The frequency obtained was approximately 10 mhz.

Example #3

| Material | Percent by Weight |
|---|---|
| silver coated titanium dioxide | 55.0 |
| polyacryl emulsion (40% in water) | 20.0 |
| ethylene-glycol-mono-butyl-ether | 5.0 |
| diethylene-glycol-mono-butyl-ether | 2.0 |
| water | 15.4 |
| sodium-nonyl-aryl-polyether-sulfonate | 0.5 |
| polyether modified di-methyl-polysiloxane | 0.5 |
| micronized polytetrafluoroethylene | 0.4 |
| associative thickner | 1.2 |
| | 100.0 |

The resin water reducible polyurethane and solvent 1-methyl-2-pyrrolidinone were mixed together with water to form a paste to which the additives were added. The conductant material, silver coated titanium dioxide was then applied to the paste and mixed therewith, the resin polyacryl emulsion acting to hold the conductive particles together in conducting relation.

The viscosity of the paste measured 3450 cps using the Brookfield spindle #3 at 20 rpm and the resistance of the paste measured 0.01 ohms/sq. cm. A coil and one plate of a capacitor were applied to a surface of a Mylar substrate. A second Mylar film was placed over the coil and capacitor plate as an insulator, and a second capacitor plate was placed on the upper surface of the second film. The two capacitors were interengaged by an electrode that extended through a corner of the second Mylar film. The resistance of the coil and capacitor was measured at 12 ohms while the tuned frequency of the coil was calculated at 10 mhz.

Example #4

| Material | Percent by Weight |
|---|---|
| silver flakes | 73.3 |
| polyacryl emulsion (40% in water) | 1.7 |
| short oil alkyd (75% solution) | 2.0 |
| acrylic resin solution (40% in water) | 1.3 |
| diethylene-glycol-mono-butyl-ether | 2.0 |
| water | 18.2 |
| sodium-nonyl-aryl-polyether-sulfonate | 0.5 |
| polyether modified di-methyl-polysiloxane | 0.5 |
| associative thickner | 0.5 |
| | 100.0 |

The resin, that is, a polyacryl emulsion, short oil alkyd and acrylic resin solution were mixed with the solvent diethylene-glycol-mono-butyl-ether with water to form a paste composition to which the wetting additive sodium-nonyl-aryl-polyether sulfonate, defoaming additive polyether modified di-methyl-polysiloxane and an associated thickner were added and mixed. Thereafter the conductive silver flake material identified as No. 135 from Handy & Harman was added to the mixture. The viscosity obtained by a Brookfield spindle #3 at 20 rpm was 2560 cps. The resistance of the paste composition was measured at 0.001 ohms/sq. cm. The resistance of the coil and capacitor as formed on both sides of a Mylar substrate was measured at 7 mhz with a tuned frequency of the coil and capacitor on both sides of the substrate measuring 5 ohms.

It was also determined that the tuned frequency of a tag as formed with the composition of Example #4 can be varied in accordance with the number of windings used in the coil. The following results were obtained with the composition of Example #4 as the number of windings in the coil was varied.

| Windings | Frequency (mhz) | Resistance (ohms) |
|---|---|---|
| 6 | 6.8 | 6.0 |
| 5 | 10.5 | 3.5 |

The tags used in the above examples were approximately one and one-half inches square.

In the operation of the security system embodying the invention, it is necessary to deactivate or neutralize the security tag 10 at a checkout station as located in a retail establishment, thereby rendering the resonant circuit of the coil inactive and incapable of being responsive to a tuned resonant frequency and the transmitting of a signal therethrough.

Referring now to FIG. *6a*, a schematic illustration of the neutralizer device is shown and is generally indicated at 42. As will be described, FIG. *6b* is a schematic illustration of a power supply generally indicated at 43 for the neutralizer device 42, the power supply 43 converting 120 volt AC line voltage to rectified and regulated voltage for introduction into the circuit of the neutralizer device 42 at selected values and locations.

In order for the neutralizer device 42 to deactivate the security tag 10, a high energy magnetic field is generated that causes induced or eddy currents to envelop and flow into the tag that is exposed to the magnetic field. The eddy current induces heat in the coil of the tag, causing the coil to break down and to either substantially increase the resistance therethrough or to cause the tuned resonant circuit to be broken thereby disabling the circuit. Thus, the induction heat created by the high energy magnetic field causes the resonant circuit in the tag 10 to be disabled when the tag is exposed to the magnetic field created by the neutralizer device 42.

Referring now to FIG. *6b*, the circuit for the power supply 43 is illustrated and supplies the rectified voltage for the neutralizer unit 42. Line current at 120 volt AC is directed to a transformer 44 that steps down the line current from 120 volts AC to 12 volts AC. A bridge rectifier 46 rectifies the voltage to 12 volts DC which is then directed through an anti-noise filtering capacitor 48 to a voltage regulator 50. The voltage regulator 50 steps down the voltage to 5 volts DC which is then directed through a second anti-noise filtering capacitor 52. As will be described, the rectified 12 volt DC current provides power for a pulsing transistor in the neutralizer device 42 and further provides the primary voltage for a high voltage transformer in the neutralizer device, the high voltage transformer supplying the current for an emission coil which emits a high energy magnetic field that is used to disable the resonant circuit in the security tag 10.

As illustrated in FIG. *6b*, a transistor 54 located in the circuit of the neutralizer 42 is pulsed by an oscillator circuit and excites the primary of high voltage transformer 56. The primary of the transformer 56 is powered by 12 volts DC taken from the output of the bridge rectifier 46 illustrated in FIG. *6b*, the secondary of the transformer 56 pulsing out a signal in the range of 12–40,000 volts DC. A diode 58 is located across the primary to eliminate any inductive kickback that might result form an emission coil 60 that is powered by the secondary of the transformer 56.

The emission coil 60 consists of a magnetic wire wound in a circumference and that emits a high energy magnetic field with a power range of 5K volts AC to 40K volts AC and operates at a frequency of 20 mhz to 100 Hz. A capacitor 61 is used to tune the transformer for resonance. One end of the emission coil 60 is connected to the contact of a spark gap 62, the other contact of the emission coil being connected to ground. The spark gap is utilized to control the amount of power the emission coil emits. The other end of the emission coil is driven by the secondary of the high voltage transformer 56.

Figure 6B:
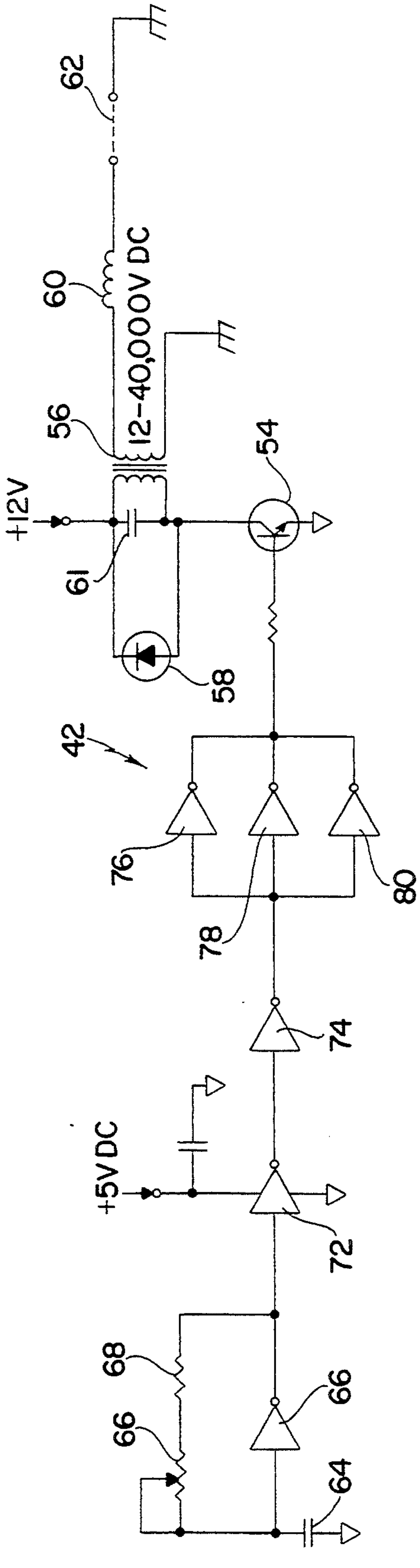
FIG. 6*b* is a schematic diagram illustrating the neutralizer device.
Figure 6A:
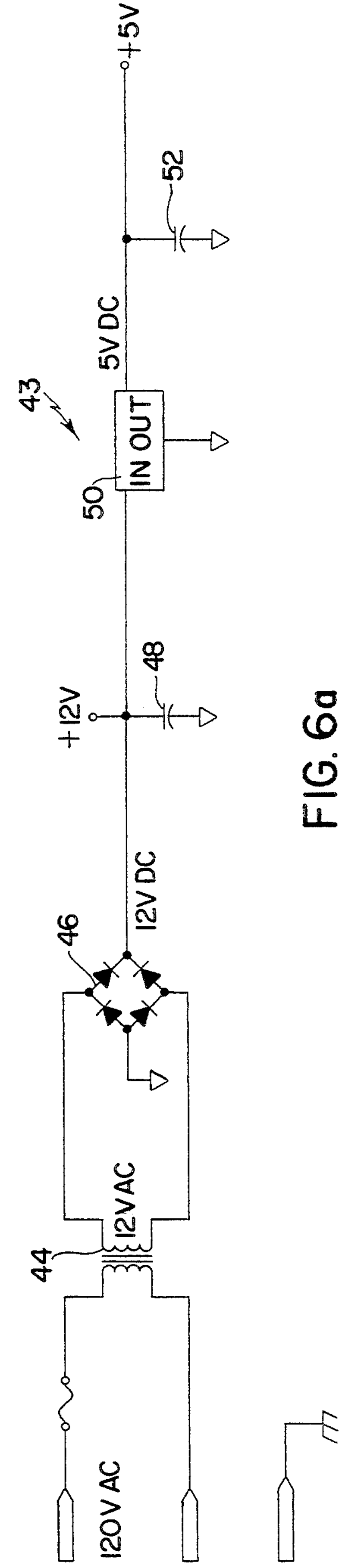
FIG. 6*a* is a schematic diagram illustrating the circuitry of the power supply for the deactivator or neutralizer device of the subject invention.

The oscillator circuit for pulsing the transistor 54 is a simple multivibrator circuit powered by 5 volts DC that is produced by the stepdown voltage regulator 50 located in the power supply 43 (FIG. 6b). In operation, when the system is powered up there is an instantaneous short across a capacitor 64 in the neutralizer circuit which drives the output of inverter gate or buffer 66 at 5 volts DC. Capacitor 64 charges through a variable resistor 66 and resistor 68. When the capacitor 64 reaches approximately 2.5 volts DC, the output of the inverter gate 66 switches to 0 volts DC which then causes the capacitor 64 to discharge. This completes a cycle. This process continues to cycle producing a square wave. The signal is cleaned up as it passes through buffer gates 72 and 74, and the parallel buffer gates 76, 78 and 80 are utilized to drive the transistor 54.

After the spark gap 62 is adjusted to effect the appropriate generation of a high energy magnetic field by the emission coil 60, eddy currents are produced that cause heating of the core of the security tag 10 that is exposed thereto. The heat generated in the security tag coil causes the conductive material in the tag coil to breakdown and, in effect, melt wherein the tuned resonant circuit in the tag coil is disabled.

In use of the security tag 10 as embodied in the subject invention, the tag as formed by the composition, such as, for example, in Example #4 is attached by suitable means to an article that is to be sold in a retail establishment. Pressure sensitive adhesives have been found to be particularly applicable in securing the tag to an article, the adhesive being adhered to the rear of the substrate and protected by a thin film that is removable when application of the tag to the article is required. It is also contemplated that the coil be applied directly to an existing label, and in this connection a suitable applicator would affix the tag to the article. Although the coil of the security tag 10 has been described as being applied to a plastic substrate such as Mylar, it is also understood that the coil and the capacitor used therewith can be affixed to a paper or cloth substrate that would then be secured to an appropriate article. A cloth substrate in the form of a label would be particularly applicable for use with clothing articles as sold in retail clothing establishments, and the coil would be applied to the front and rear surfaces of the cloth label. Because the coil and capacitor that define a part thereof is formed of a composition material as described, the adhering of the coil to a cloth label could be accomplished because of the inherent characteristics of the coil composition that enable it to be adhered to most surfaces. Similarly, the coil of the subject invention could be imprinted on a conventional paper label that is attached to many kinds of articles that may be formed of glass or metal; or the coil could be imprinted directly onto a cardboard or plastic container surface which are utilized in most prepackaged food materials. In this instance, a special imprinting tool would be utilized to affix the coil and the capacitors that form a part thereof to the container surface.

In all applications of the security tag as described, the article to which the tag is applied is subject to being exposed to the neutralizer device 42 that is located at a checkout station in a retail establishment. The coil of the tag when placed within two to five inches, for example, of the neutralizer is subject to the heat generated by the high voltage magnetic field emitted by the emission coil 60 in the neutralizer and is caused to melt, whereby the resonant circuit in the tag is disabled.

If the security tag is not exposed to the neutralizer device 42, a scanner device (not shown) which is located at an exit area emits a signal, the frequency of which is tuned to the resonant frequency of the coil in the security tag. The signal is then detected by the scanner that sounds an alarm to indicate that the resonant circuit in the tag has not been disabled and that the article to which the tag is attached has not been properly checked through the checkout station.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A security system having a security tag that is applied to an article located for sale in a retail establishment, said tag comprising a substrate that is formed of a non-conductive material and that includes opposed parallel surfaces, a coil having electrical conductive characteristics and being imprinted on one of said surfaces of said substrate, and a capacitor having portions respectively imprinted on said opposed surfaces of said substrate, said capacitor being electrically connected to said coil, wherein said coil and said capacitor define an electrical circuit having a predetermined single tuned resonant detection frequency and being responsive to a swept radio frequency signal transmitted at said predetermined tuned detection resonant frequency, wherein said circuit resonates to produce a signal that is detected by an alarm circuit, the material from which said coil and capacitor are formed including a plurality of separate particles having electrical conductive characteristics and that are disposed in electrical engaging relation, and a binder that is intermixed with the conductive particles for fixing the particles in said electrical engaging relation to provide for electrical continuity throughout said coil and capacitor, said binder comprising a resin that is selected from a group consisting of alkyd, epoxy, polyacryl, polyamid, polyurethane, polyvinyl acetate, hydrocarbon resin, nitrocellulose, polyvinyl chloride and rosin, said resin further including a copolymer comprising two or more monomers selected from a group consisting of acryl, vinyl, styrene, urethane, vinyl acetate and oil, said coil and capacitor being further responsive to application of a predetermined magnitude of induction heat thereto that results from the emission from a source of an electromagnetic field located in close proximity thereto for breaking down the electrical continuity of the conductive material in said coil and capacitor to increase the resistance thereof thereby inhibiting electrical conductivity therethrough.

2. A security system having a security tag that is applied to an article located for sale in a retail establishment, said tag comprising a substrate that is formed of a non-conductive material and that includes opposed parallel surfaces, a coil having electrical conductive characteristics and being imprinted on one of said surfaces of said substrate, and a capacitor having portions respectively imprinted on said opposed surfaces of said substrate, said capacitor being electrically connected to said coil, wherein said coil and said capacitor define an electrical circuit having a predetermined single tuned resonant detection frequency and being responsive to a swept radio frequency signal transmitted at said predetermined tuned detection resonant frequency, wherein said circuit resonates to produce a signal that is detected by an alarm circuit, the material from which said coil and capacitor are formed including a plurality of separate particles having electrical conductive characteristics and that are disposed in electrical engaging relation, and a binder that is intermixed with the conductive particles for fixing the particles in said electrical engaging relation to provide for electrical continuity throughout said coil and capacitor, said binder in said coil being formed of a resin, the composition of said coil further including a solvent, water and a plurality of additives having predetermined selected characteristics, said coil and capacitor being further responsive to application of a predetermined magnitude of induction heat thereto that results from the emission from a source of an electromagnetic field located in close proximity thereto for breaking down the electrical continuity of the conductive material in said coil and capacitor to increase the resistance thereof thereby inhibiting electrical conductivity therethrough.

3. A security system as claimed in claim 2, an additive in said composition having the characteristics of a defoamer that is utilized for preventing bubbling in the composition of said coil, said defoamer being selected from a group consisting of silicone based aryl-alkyd, modified methyl-alkyl-polysiloxane and non-silicone based 2,4,7,9-tetramethyl-5-decyn-4,7-diol.

4. A security system as claimed in claim 2, an additive in said composition having the characteristics of a dispersing agent for providing for dispersing of the conductive material in the composition of the coil, said dispersing agent being selected from a group consisting of polyethylene-oxide alkyl-aryl ether, dioctyl sodium sulfosuccinate and sodium alkylaryl polyether sulfonate.

5. A security system as claimed in claim 2, an additive in said composition having the characteristics of a leveling agent for providing for an even and glossy substrate surface for the coil composition, said leveling agent including polyether modified di-metyl-polysiloxanes.

6. A security system as claimed in claim 2, an additive in said composition having the characteristics of preventing marring of the substrate on which the conductive coil is adhered and being selected from a group consisting of polyether modified methyl-alkyl polysiloxanes, micronized low density polyethylene and micronized polytetrafluoroethylene.

7. A security system as claimed in claim 6, further comprising a slip additive used with said mar preventing additive and consisting of polyether modified polysiloxane copolymer.

8. A security system as claimed in claim 2, an additive in said composition having the characteristics of wetting the substrate and consisting of polyether modified methyl-ethyl-polysiloxanes.

9. A security system as claimed in claim 2, further comprising a thickener additive for forming the conductive coil composition in a paste-like material for application to said substrate and being selected from a group consisting of water-soluble polymers, including cellulosics, alkali-soluble acrylic polymer, alkali-swellable acrylic polymer, and associative thickeners.

10. A security system having a security tag that is applied to an article located for sale in a retail establishment, said tag comprising a substrate that is formed of a non-conductive material and that includes opposed parallel surfaces, a coil having electrical conductive characteristics and being imprinted on one of said surfaces of said substrate, and a capacitor having portions respectively imprinted on said opposed surfaces of said substrate, said capacitor being electrically connected to said coil, wherein said coil and said capacitor define an electrical circuit having a predetermined single tuned resonant detection frequency and being responsive to a swept radio frequency signal transmitted at said predetermined tuned detection resonant frequency, wherein said circuit resonates to produce a signal that is detected by an alarm circuit, the material from which said coil and capacitor are formed including a plurality of separate particles having electrical conductive characteristics and that are disposed in electrical engaging relation, and a binder that is intermixed with the conductive particles for fixing the particles in said electrical engaging relation to provide for electrical continuity throughout said coil and capacitor, said coil and capacitor being further responsive to application of a predetermined magnitude of induction heat thereto that results from the emission from a source of an electromagnetic field located in close proximity thereto for breaking down the electrical continuity of the conductive material in said coil and capacitor to increase the resistance thereof thereby inhibiting electrical conductivity therethrough, said source including means for transforming and rectifying line voltage to a rectified feed voltage having a range of 5 volts to 12 volts, means for adjusting said rectified feed voltage for introduction into a high voltage transformer, wherein a high voltage is obtained that has a range of 5,000 volts to 40,000 volts, and an emission coil electrically connected to said high voltage transformer and producing a high voltage electromagnetic field that produces induction heating in close proximity to said conductive coil for increasing the resistance therethrough.

11. A security system as claimed in claim 10, said means for adjusting said feed voltage including buffer units arranged in series for obtaining a pulsing effect and a plurality of parallel buffer units that increase the value of said feed voltage as it is introduced into said high voltage transformer.

* * * * *